United States Patent
Mally et al.

(10) Patent No.: US 6,843,950 B1
(45) Date of Patent: Jan. 18, 2005

(54) DEVICE FOR APPLYING A PLASTIC SHEATHING TO A PIPELINE AT PIPE CONNECTIONS

(75) Inventors: Günter Mally, Hamm (DE); Peter A. Blome, Herne (DE)

(73) Assignee: EUPEC Pipe Coatings GmbH, Muelheim (DE)

( * ) Notice: Subject to any disclaimer, the term of this patent is extended or adjusted under 35 U.S.C. 154(b) by 246 days.

(21) Appl. No.: 10/130,200

(22) PCT Filed: Nov. 2, 2000

(86) PCT No.: PCT/DE00/03892

§ 371 (c)(1),
(2), (4) Date: May 14, 2002

(87) PCT Pub. No.: WO01/36173

PCT Pub. Date: May 25, 2001

(30) Foreign Application Priority Data

Nov. 15, 1999 (DE) .......................... 199 55 726

(51) Int. Cl.⁷ ........................... B29C 45/14; B29C 70/74
(52) U.S. Cl. .................... 264/276; 264/271.1; 264/327; 425/116; 425/123; 425/129.1; 249/79; 249/111
(58) Field of Search ................................ 425/116, 123, 425/129.1; 249/79, 111; 264/271.1, 276, 327; B29C 70/74

(56) References Cited

U.S. PATENT DOCUMENTS

| | | | |
|---|---|---|---|
| 1,650,260 A | * 11/1927 | Candler | 249/111 |
| 2,759,231 A | * 8/1956 | Parlanti | 249/111 |
| 3,593,391 A | * 7/1971 | Routh | 425/129.1 |
| 3,964,845 A | * 6/1976 | Duggan et al. | 425/129.1 |
| 4,145,176 A | * 3/1979 | Nelson | 425/116 |
| 4,204,896 A | * 5/1980 | Richardson | 156/49 |
| 5,238,615 A | * 8/1993 | Stoor | 264/262 |
| 5,397,229 A | * 3/1995 | Kitano | 425/425 |
| 5,407,340 A | * 4/1995 | Daguet et al. | 425/116 |

FOREIGN PATENT DOCUMENTS

JP    04290712 A   * 10/1992   ........... B29C/45/14

* cited by examiner

Primary Examiner—Robert B. Davis
(74) Attorney, Agent, or Firm—Cohen, Pontani, Lieberman & Pavane

(57) ABSTRACT

The invention relates to a device for the plastic sheathing of connections, which are produced by circular weld seams, of a pipeline comprising steel pipes which are provided with a factory-fitted plastic insulation and are reinsulated in the region of the circular weld seam by injection molding, having a split injection mold, which can be connected to an injection-molding fixture and, in the region of the weld seam, can be laid and secured, in the manner of a sleeve, around the steel pipes in such a manner that the injection mold in each case covers the end of the factory-fitted plastic insulation of the two steel pipes which have been welded together, the injection mold having an internal diameter, at least in the axial region between the factory-fitted plastic insulations, which corresponds to the external diameter of the plastic sheathing which is to be produced in the region of the weld seam and having an internal diameter, at its ends, which corresponds to the external diameter of the factory-fitted plastic insulation. In this device, in each case one cooling means, which runs in the circumferential direction, is arranged in the region of the ends of the injection mold.

16 Claims, 1 Drawing Sheet

DEVICE FOR APPLYING A PLASTIC SHEATHING TO A PIPELINE AT PIPE CONNECTIONS

PRIORITY CLAIM

This is a U.S. national stage of application No. PCT/DE00/03892, filed on Nov. 2, 2000. Priority is claimed on that application and on the following application Country: Germany, Application No.: 199 55 726.8, Filed: Nov. 15, 1999.

BACKGROUND OF THE INVENTION

1. Field of the Invention

The invention relates to a device for the plastic sheathing of connections, which are produced by circular weld seams, of a pipeline comprising steel pipes which are provided with a factory-fitted plastic insulation which is axially spaced from the weld seam to form an axial region between the insulation of respective pipes, the device including a split injection mold which can be connected to an injection-molding fixture so that it covers the axial region in the manner of a sleeve and extends over the plastic insulation on the pipes.

2. Description of the Related Art

WO 90/02038 has disclosed a device for reinsulating steel pipes which have in each case been connected to one another by a circular weld seam and have already been provided with a factory-fitted plastic insulation, for example comprising polyethylene or polypropylene. To ensure that the factory-fitted plastic insulation is not damaged by the welding operation, the pipes have in each case been left without a coating over a short section of their axial length at the ends. After two pipes have been connected by a circular weld seam, the uncoated partial lengths have to be reinsulated in the region of the connection in order to prevent external corrosion. For this purpose, an injection mold is provided, which is fitted around the steel pipes in the manner of a sleeve in the region of the circular weld seam and can be connected to an injection-molding fixture for an injection-moldable plastic via a gate device. Its axial length is dimensioned in such a way that it covers the region of the partial length which is to be reinsulated with an overlap and its two ends rest on the existing factory-fitted plastic sheathing of the two connected steel pipes. To allow rapid fitting of the injection mold onto the connecting region of the pipeline and to make it easy to remove the mold again from the pipeline after reinsulation has been completed, the mold is of split design. Typically, it comprises two half-shells, which are held together, for example, by a hinge, are placed around the pipeline and are then connected to one another at the open part by a locking means, so that it is secured on the section of pipe. The injection mold is designed substantially in the form of a hollow cylinder, with its internal diameter, in the region of the weld seam region which is to be reinsulated, corresponding to the external diameter of the plastic sheathing which is to be produced. It therefore surrounds the reinsulation region at a certain distance therefrom. By contrast, at its ends the internal diameter of the injection mold is smaller and corresponds to the external diameter of the factory-fitted plastic insulation.

In practical operation, however, there is often a certain annular gap between the factory-fitted plastic insulation and the inner surface of the injection mold at the ends of the latter. This annular gap causes problems, since some of the plastic which is injected into the injection mold escapes to the outside through this gap, the size of which should ideally be zero. This leads to a pressure loss in the injection mold, which is disadvantageous for correct realization of the reinsulation and may lead to quality losses (e.g. inclusion of air bubbles in the coating). The larger the diameter of the steel pipes and the greater the deviations from the ideal pipe geometry (e.g. ovality), the more serious this problem becomes.

It is known from U.S. Pat. No. 3,387,075 A that, in a process for producing domestic sieves from plastic by injection molding, the flow front of the plastic material undesirably comes to a standstill as a result of cooling. Furthermore, DE 34 40 326.4 has disclosed an injection-molding process for the production of domestic sieves in which a sieve mesh, which is curved substantially in the shape of a hemisphere and is made from wire, is clamped in a two-part injection mold in the region of an encircling collar on a narrow annular surface before the collar is extrusion-coated with plastic and a handle is injection-molded on. Cooling of the mold or of the clamped-in sieve mesh reliably prevents plastic from undesirably escaping beyond the region of the clamped-in zone. These documents do not provide any indications whatsoever with regard to reinsulation of steel pipes in the region of a circular weld seam.

SUMMARY OF THE INVENTION

Therefore, it is an object of the present invention to improve a device of the generic type in such a way that an effective seal is ensured in the region of the end sides of the device even when weld seam regions on pipes of large diameters and/or with relatively considerable deviations in their cross section from the ideal circular shape are being reinsulated. The associated outlay is to be as low as possible.

According to the invention, this object is achieved by the fact that in each case one cooling means, which runs in the circumferential direction, is arranged in the region of the ends of the injection mold, which cooling means rapidly cools and solidifies the plastic material of the reinsulation, which emerges from the cavity which is to be filled by the plastic material of the reinsulation through the annular gap between the factory-fitted plastic insulation and the injection mold resting on it. Therefore, the basic idea of the present invention is to be considered as residing in the fact that there is no attempt to set up the device itself in such a way that it bears in a completely sealed manner against the factory-fitted plastic insulation from the outset, but rather the plastic material which is used for the reinsulation is itself employed to form the seal. The free-flowing plastic material which enters the annular gap between the device and the existing factory-fitted plastic insulation is immediately cooled by a cooling means on the device, so that it solidifies before disruptive quantities of the material can escape from the device. As a result, the solidified plastic material used for the reinsulation effects a seal which is so effective that this seal is able to withstand the injection-molding pressure of, for example, 200 bar or more which prevails in the injection mold without any difficulty. Consequently, the pressure drop which has hitherto often occurred is completely avoided, so that it is possible to produce a high-quality reinsulation. The outlay required for the inventive solution is very low.

DETAILED DESCRIPTION OF THE PRESENTLY PREFERRED EMBODIMENTS

Figure 1:
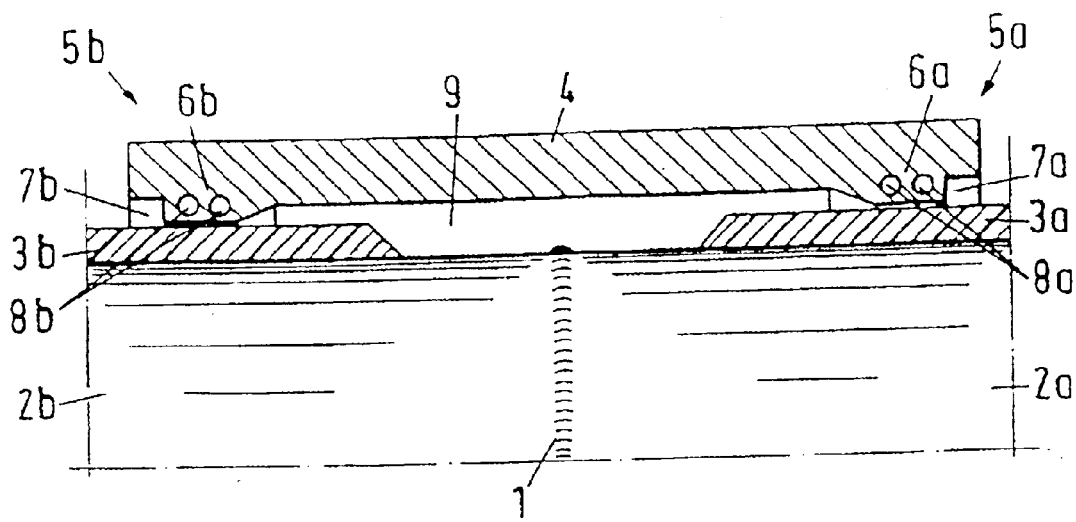
FIG. 1 shows an axial longitudinal section through a device according to the invention which is mounted on a pipe section.

FIG. 1 illustrates the area of two steel pipes 2a, 2b, which have been provided with a factory-fitted plastic insulation 3a, 3b comprising, for example, polyethylene or polypropylene and which have been connected to one another by a circular weld seam 1. The factory-fitted coating is absent in the immediate region of the weld seam 1, since it would in any case be destroyed by the heat which is generated while the circular weld seam 1 is being produced. The factory-fitted coating 3a, 3b advantageously ends in an inclined slope. To prevent the harmful effects of external corrosion on the steel pipes 2a, 2b in the region of the circular weld seam 1, extremely high-quality reinsulation, i.e. further insulation which matches the quality of the factory-fitted plastic sheathing, has to take place. This is made possible by the device according to the invention, which forms an injection mold 4 which is of split design, so that it can easily be fitted onto the pipeline section of the steel pipes 2a, 2b and can be quickly removed again from this section after the reinsulation has been carried out. For this purpose, the injection mold 4, which is substantially in the shape of a hollow cylinder, is composed, in a manner which is not illustrated in more detail, of two half-shells which, by way of example, are held together on one side by a hinge, in such a manner that they can be folded open, and on the other side can be rigidly connected to one another by an easy-to-operate locking device. On its inner side, the dimensions of the injection mold 4 are such that it creates a cavity 9 toward the pipe surface, which cavity is to be filled up by the plastic material of the reinsulation and in the axial direction covers the region of the circular weld seam 1 sufficiently far for the ends of the factory-fitted plastic insulation 3a, 3b also to be overlapped. For this purpose, the internal diameter in this region is greater than the diameter of the factory-fitted plastic insulation 3a, 3b. By contrast, in the region of the ends 5a, 5b of the injection mold 4, its internal diameter is considerably smaller and corresponds to the external diameter of the factory-fitted plastic insulation 3a, 3b. Therefore, in the mounted state, the injection mold 4 bears relatively tightly against the plastic insulation 3a, 3b right from the outset. However, in most cases there is a gap (annular gap 7a, 7b) between the injection mold 4 and the factory-fitted plastic insulation 3a, 3b at least in partial regions over the circumference of the pipe, in particular because of diameter tolerances in the steel pipes 2a, 2b and deviations from the ideal circular pipe shape (ovality). In the region of the ends 5a, 5b of the injection mold 4, the latter has in each case one cooling means 6a, 6b, which in the exemplary embodiment illustrated are designed in the form of encircling cooling passages 8a, 8b, which run parallel to one another, for a liquid cooling medium. The cooling passages 8a, 8b may, for example, be connected to one another in such a way that the coolant flows through one cooling passage in a defined direction and, in the region of the parting of the injection mold, is diverted into the other cooling passage and flows back in the opposite direction, parallel to the first cooling passage. The connections for supplying and discharging the cooling medium have not been illustrated in further detail in FIG. 1. The connections for supplying and discharging the cooling medium are preferably in each case arranged close to the parting of the injection mold. The question of whether one or more cooling passages are provided depends on the particular requirements of the injection mold 4. It is not only the cross-sectional shape and cross-sectional size of the cooling passage(s), but also the temperature of the coolant provided which are of importance in this context.

The free-flowing plastic for the reinsulation can be injected into the cavity 9 which surrounds the pipeline section in the form of a ring through a gate device (not shown). If polyethylene is being used, the injected material of the plastic reinsulation is at a temperature of, for example, approx. 200–220° C. This temperature is sufficient to melt the surface of the factory-fitted plastic insulation, so that it is welded to the material used for the reinsulation. The quantity injected fills the cavity 9 to an increasing extent and, since the injection mold 4 does not bear in a completely sealed manner against the factory-fitted plastic insulation 3a, 3b, penetrates into the annular gaps 7a, 7b in the region of the ends 5a, 5b. Since the wall of the injection mold 4 is at a temperature which is well below the temperature of the injected plastic material at these points on account of the action of the cooling means 6a, 6b, so much heat is very quickly extracted from the plastic material which has entered the annular gaps 7a, 7b that the plastic material solidifies and, in this way, produces an extremely effective annular seal of the injection mold 4 with respect to the outside, so that it is impossible for any material to actually escape to the outside, at least in significant quantities.

Figure 2:
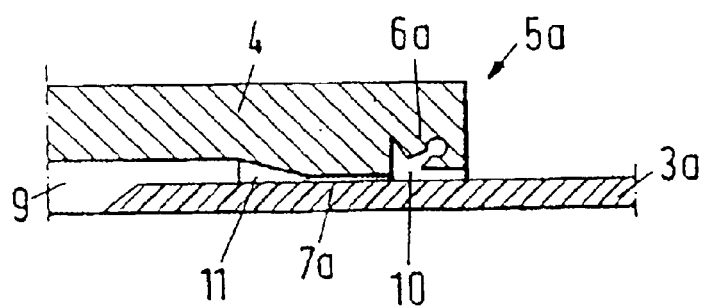
FIG. 2 shows part of a device according to the invention with a modified cooling means in longitudinal section.

FIG. 2 shows a modification of the device according to the invention illustrated in FIG. 1. The modification relates only to the cooling means 6a arranged in the end region 5a.

This cooling means is now designed not as liquid cooling but rather as gas cooling with an outlet nozzle 10 arranged in the form of a ring. The outlet direction of the gas outlet nozzle 10 is directed onto the annular gap 7a from the outside. Therefore, the material of the reinsulation which is injected into the cavity 9 can initially readily enter the annular gap 7a. However, as soon as it attempts to move out of the injection mold 4 to the outside, it passes into the active region of the gas cooling. In this case too, the cooling which is brought about by the gas cooling ensures extremely rapid solidification of the escaping plastic material, so that effective sealing of the injection mold 4 is ensured before significant quantities of plastic material can escape from the cavity 9.

The transition region 11 between that part of the injection mold 4 whose internal diameter corresponds to the diameter of the plastic sheathing (reinsulation layer) which is to be produced and the region of the ends 5a, 5b whose internal diameter corresponds to the factory-fitted plastic insulation 2a, 2b is of conical design. This results in a reinsulation layer which has a relatively gentle transition to the existing factory-fitted plastic insulation 3a, 3b.

In principle, a suitable liquid coolant is cooling water, in particular if it has been brought to a temperature which is well below ambient temperature. Extremely effective cooling results if liquid nitrogen is used. For gas cooling it is possible, for example, to use compressed air or another compressed gas. It is possible to make use of the advantage that the temperature of the gas, on account of its expansion, falls considerably as it emerges from the outlet nozzle which is laid around the pipe section in the form of a ring.

The cooling means may also be designed in the form of cooling ribs which are arranged externally, close to the ends of the device according to the invention. In this way, the heat which is to be dissipated, can be released to the environment by convection. However, this form of cooling is generally less effective than the solutions which have been illustrated in FIGS. 1 and 2.

In some cases, in particular when the cycle times for the individual reinsulation processes are relatively long, it may even be sufficient for the cooling means to be effected purely by means of an accumulation of material (i.e. greater wall thicknesses) in the region of the ends of the device. The dimensions of this accumulation of material, taking account of the specific heat capacity of this material, must be such that the mass of the material is sufficient to be able to absorb at least the quantity of heat which is to be dissipated in the region of the ends during a reinsulation process without the temperature of the accumulation of material rising to near the melting point of the material used for the reinsulation. Rather, the temperature to which the ends having the accumulation of material are heated must be considerably below this point, in order to ensure sufficiently rapid cooling of the molten material in the region of the annular seal of the injection mold. To ensure that the device is not continuously heated to ever higher temperatures during the reinsulation processes which take place on a cyclical basis, it is necessary to ensure that sufficient time remains between in each case two reinsulation processes which immediately follow one another to allow sufficient heat to be dissipated to the outside as a result of the "normal" cooling in ambient air or as a result of the application of separate external cooling (e.g. as a result of the device being wetted with cooling water).

Within the context of the invention, it is also possible for the different types of cooling means to be combined with one another in one device. It is particularly advantageous to simultaneously employ a gas cooling system of the type described above (FIG. 2) and external cooling ribs and/or relatively large accumulations of material in the region of the ends.

What is claimed is:

1. A device for producing a plastic sheath on a circular weld seam connecting two pipes of a pipeline, each pipe being provided with factory-fitted plastic insulation having an external diameter and axially spaced from said weld seam to form an axial region between the plastic insulation of respective said pipes, said device comprising a split injection mold which can be connected to an injection-molding fixture so that it covers the axial region in the manner of a sleeve and extends over the plastic insulation on the pipes, said injection mold comprising
    a pair of opposed ends with an internal diameter which is spaced from the external diameter of the plastic insulation to form a pair of annular gaps,
    a portion having an internal diameter forming a cavity corresponding to the outside diameter of the sheath to be produced, and
    circumferentially extending cooling means arranged at said ends for cooling and solidifying plastic material injected into said cavity as it emerges through said annular gaps, said cooling means comprising an outlet nozzle in the form of a channel for discharging a gas into each said annular gap.

2. A device as in claim 1 wherein said cooling means comprises at least one closed cooling passage in each said end for carrying a liquid coolant.

3. A device as in claim 2 wherein said cooling means comprises a pair of said cooling passages in each said end, said cooling means further comprising means for diverting liquid coolant so that said coolant flows in opposite directions in said passages of each said pair.

4. A device as in claim 2 wherein said cooling means further comprises connections for supplying and discharging liquid coolant to each said passage, each said connection being arranged at the parting of the injection mold.

5. A device as in claim 1 wherein said portion having an internal diameter forming a cavity comprises a pair of transition portions adjacent to respective said ends, said transition portions each having a conical profile.

6. A device as in claim 1 wherein said cooling means comprises external cooling ribs.

7. A device as in claim 1 wherein said cooling means comprises an accumulation of material at each said end, said accumulation having a mass which is sufficient to absorb the heat which has to be dissipated during injection molding without the accumulation reaching the melting temperature of the injected plastic.

8. A device for producing a plastic sheath on a circular weld seam connecting two pipes of a pipeline, each pipe being provided with factory-fitted plastic insulation having an external diameter and axially spaced from said weld seam to form an axial region between the plastic insulation of respective said pipes, said device comprising a split injection mold which can be connected to an injection-molding fixture so that it covers the axial region in the manner of a sleeve and extends over the plastic insulation on the pipes, said injection mold comprising
    a pair of opposed ends with an internal diameter which is spaced from the external diameter of the plastic insulation to form a pair of annular gaps,
    a portion having an internal diameter forming a cavity corresponding to the outside diameter of the sheath to be produced, and
    circumferentially extending cooling means arranged at said ends for cooling and solidifying plastic material injected into said cavity as it emerges through said annular gaps, wherein said cooling means comprises at least one of external cooling fins and an accumulation of material at each said end, said accumulation having a mass which is sufficient to absorb the heat which has to be dissipated during injection molding without the accumulation reaching the melting temperature of the injected plastic.

9. A method for joining together the ends of two respective pipes having factory-fitted plastic insulation having an external diameter, said method comprising:
    removing some of the plastic insulation from each pipe so that the plastic insulation is spaced from the end of each pipe;
    welding the ends of the pipes together to form a circular weld seam connecting the pipes, whereby the connected pipes have an axial region between the plastic insulation of the respective pipes;
    fitting a split injection mold onto the connected pipes, the mold having a pair of opposed ends with an internal diameter which is spaced from the external diameter of the plastic insulation to form gaps, a portion having an internal diameter forming a cavity corresponding to the outside diameter of the sheath to be produced, and circumferentially extending cooling means arranged at the ends of the mold for cooling and solidifying plastic material as it emerges through the annular gaps; and
    injecting melted plastic material into the cavity formed between the mold and the axial region, whereby,
    the melted plastic cools and solidifies as it emerges through the annular gaps, thereby forming a sheath which is sealed to the factory-fitted plastic insulation.

10. A method as in claim 9 wherein the cooling means comprises at least one closed cooling passage in each said end of said mold for carrying a liquid coolant.

11. A method as in claim 10 wherein the cooling means comprises a pair of cooling passages in each said end of said mold, said method comprising diverting liquid coolant so that the liquid coolant flows in opposite directions in the passages of each pair.

12. A method as in claim 10 wherein said cooling means further comprises connections for supplying and discharging liquid coolant to each said passage, each said connection being arranged at the parting of the injection mold.

13. A method as in claim 9 wherein said cooling means comprises an outlet nozzle in the form of a channel in each said end of said mold, said method further comprising discharging a gas into said gaps via said nozzles as said melted plastic material is injected into said cavity.

14. A method as in claim 9 wherein said portion having an internal diameter forming a cavity comprises a pair of transition portions adjacent to respective said ends, said transition portions each having a conical profile.

15. A method as in claim 9 wherein said cooling means comprises external cooling ribs.

16. A method as in claim 9 wherein said cooling means comprises an accumulation of material at each said end, said accumulation having a mass which is sufficient to absorb the heat which is dissipated during injection molding without the accumulation reaching the melting temperature of the injected plastic.

* * * * *